United States Patent Office 2,878,124
Patented Mar. 17, 1959

2,878,124

FOOD ADDITIVES

Winfried Kruckenberg, Leverkusen-Bayerwerk, Germany, assignor to Farbenfabriken Bayer Aktiengesellschaft, Leverkusen, Germany, a corporation of Germany No Drawing. Application March 5, 1957
Serial No. 643,946

Claims priority, application Germany March 10, 1956

3 Claims. (Cl. 99—4)

This invention relates to growth promoting feeding stuffs.

It is a well known fact that a number of so-called essential amino acids (for example lysine) must be supplied to the animal organism. It is also well known that these essential amino acids are sometimes present in too small a quantity in vegetable protein and that consequently the full value of the food cannot be utilized when only vegetable foodstuffs are supplied. If these lacking amino acids, for example lysine, are added artificially to the vegetable feeding stuff, the latter is better utilized, that is to say, more rapid growth can be obtained with the same amount of feeding stuff.

It is an object of the present invention to provide a novel growth promoting feeding stuff.

According to this invention I have found that better utilization of vegetable feeding stuffs, i. e. more rapid growth, can be obtained if the feeding stuff contains $\alpha,\gamma$-dihydroxy-butyric acid.

Accordingly, the present invention provides a process for the production of a rapid growth promoting vegetable feeding stuff, which comprises incorporating $\alpha,\gamma$-dihydroxy-butyric acid in a vegetable feeding stuff.

This discovery is very surprising, since $\alpha,\gamma$-dihydroxy-butyric acid does not belong to the essential amino acids. It is also surprising that this compound is very much more effective than lysine, since the same increase in the rate of growth is obtained with the same basic foodstuff by adding only 0.1% of $\alpha,\gamma$-dihydroxy-butyric acid instead of 0.5% of lysine.

The vegetable protein containing feeding stuffs, for example for poultry and animals such as pigs, can be prepared by adding to the vegetable proteins a certain amount of the $\alpha,\gamma$-dihydroxy-butyric acid. In general it is sufficient if an amount of about 0.01–0.2% preferably 0.05–0.1% by weight, of the $\alpha,\gamma$-dihydroxy-butyric acid is added to the vegetable protein. The $\alpha,\gamma$-dihydroxy-butyric acid can be added as chemical.

*Example*

Three batches each of 30 white Leghorn chickens with similar hereditary characteristics were fed under the same conditions in three parallel series of experiments. In these experiments the feeding stuff consisted of:

(a) A vegetable protein consisting of:
  20 parts by weight of oats
  20 parts by weight of maize flour
  10 parts by weight of wheat coarse meal
  16 parts by weight of wheat flour
  2 parts by weight of soy coarse meal and
  2 parts by weight of minerals and vitamins;
(b) The vegetable protein mentioned under (a) and also 0.1% of $\alpha,\gamma$-dihydroxy-butyric acid and
(c) The vegetable proteins mentioned under (a) and also 0.5% of lysine.

For an increase of 100 g. in body weight the group (a) required 330 g. of feeding stuff, whereas the group (b) required only 223 g. and the group (c) required 230 g.

I claim:

1. A vegetable, poultry and animal feed comprising a lysine deficient poultry and animal feed containing $\alpha,\gamma$-dihydroxy-butyric acid.

2. Feed according to claim 1 containing the $\alpha,\gamma$-dihydroxy-butyric acid in amount of about 0.01–0.2% by weight.

3. Process for the production of a rapid growth promoting poultry and animal vegetable feed which comprises incorporating $\alpha,\gamma$-dihydroxy-butyric acid in a vegetable feed having a deficiency of lysine.

References Cited in the file of this patent

UNITED STATES PATENTS

| | | |
|---|---|---|
| 2,623,824 | Gandry | Dec. 30, 1952 |
| 2,727,065 | Anagnostopoulas | Dec. 13, 1955 |
| 2,745,745 | Blake | Mar. 15, 1956 |